(12) United States Patent
Olgren

(10) Patent No.: US 7,942,076 B2
(45) Date of Patent: May 17, 2011

(54) ADJUSTABLE STEERING COLUMN ASSEMBLY

(75) Inventor: Leland N. Olgren, Frankenmuth, MI (US)

(73) Assignee: Nexteer (Beijing) Technology Co., Ltd.

( * ) Notice: Subject to any disclaimer, the term of this patent is extended or adjusted under 35 U.S.C. 154(b) by 497 days.

(21) Appl. No.: 12/031,100

(22) Filed: Feb. 14, 2008

(65) Prior Publication Data

US 2009/0205459 A1    Aug. 20, 2009

(51) Int. Cl.
*B62D 1/18* (2006.01)
(52) U.S. Cl. .......................................... 74/493; 280/775
(58) Field of Classification Search ................ 74/492, 74/493, 494, 495; 280/775
See application file for complete search history.

(56) References Cited

U.S. PATENT DOCUMENTS

| | | | |
|---|---|---|---|
| 4,046,024 A | 9/1977 | Broucksou | |
| 4,538,478 A * | 9/1985 | Sato et al. ........................ | 74/493 |
| 4,723,461 A * | 2/1988 | Yoshida et al. .................. | 74/493 |
| 5,282,394 A | 2/1994 | Dominique et al. | |
| 5,409,261 A | 4/1995 | Yamaguchi | |
| 5,931,501 A | 8/1999 | Baumann et al. | |
| 6,036,228 A | 3/2000 | Olgren et al. | |
| 6,695,349 B2 * | 2/2004 | Bohlen et al. .................. | 280/775 |
| 6,986,531 B2 | 1/2006 | Ohtsu et al. | |
| 7,021,660 B2 | 4/2006 | D'Agostino et al. | |
| 2001/0042420 A1 | 11/2001 | Danielsson | |
| 2004/0159173 A1 | 8/2004 | Sawada | |
| 2005/0017492 A1 | 1/2005 | Ohtsu et al. | |
| 2005/0127656 A1 | 6/2005 | Sato et al. | |
| 2006/0151985 A1 | 7/2006 | Li et al. | |
| 2007/0284867 A1 * | 12/2007 | Cymbal et al. ................. | 280/775 |

* cited by examiner

*Primary Examiner* — Justin Krause
(74) *Attorney, Agent, or Firm* — Cantor Colburn LLP

(57) ABSTRACT

An adjustable steering column assembly having a column jacket defining a longitudinal axis and moveable in at least one of a telescoping direction and a tilting direction is disclosed. A bracket is coupled to the column jacket with at least one pivot shaft coupled to the bracket along a pivot axis. A lever is mounted to the pivot shaft and rotates between a set position for preventing movement of the column jacket and an adjustable position for allowing movement of the column jacket. A locking device engages the lever and moves between a locked position and an unlocked position in response to rotation of the lever between the set and adjustable positions, respectively. A restrictor encircles the bracket, the column jacket, the lever and the locking device for resisting against an outwardly radial force produced by the locking device when in the locked position.

11 Claims, 8 Drawing Sheets

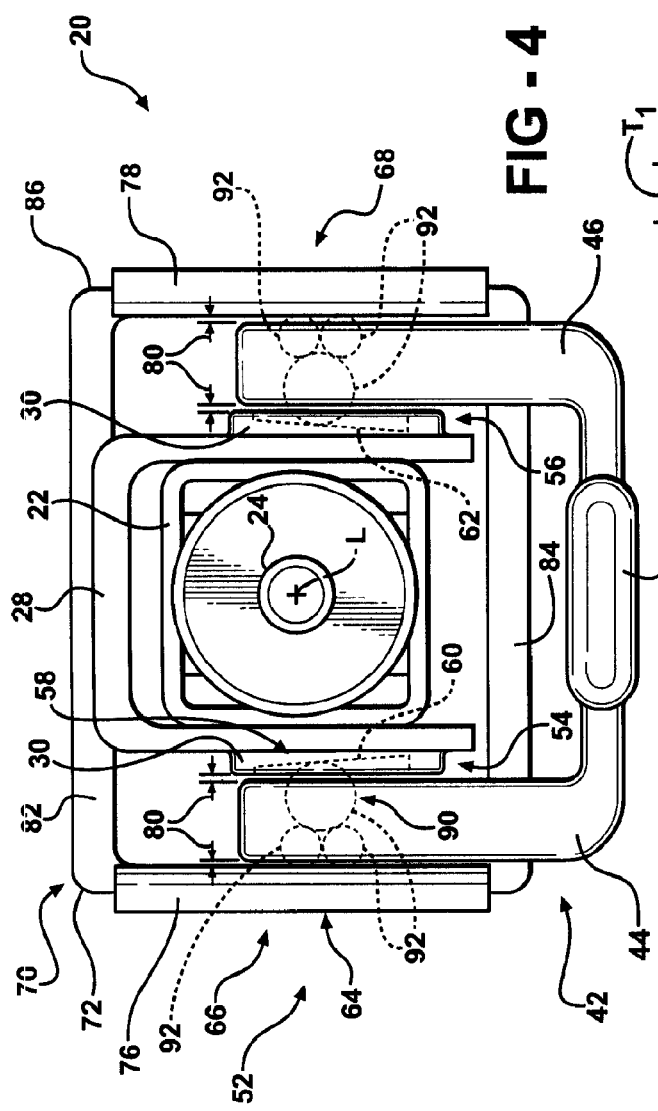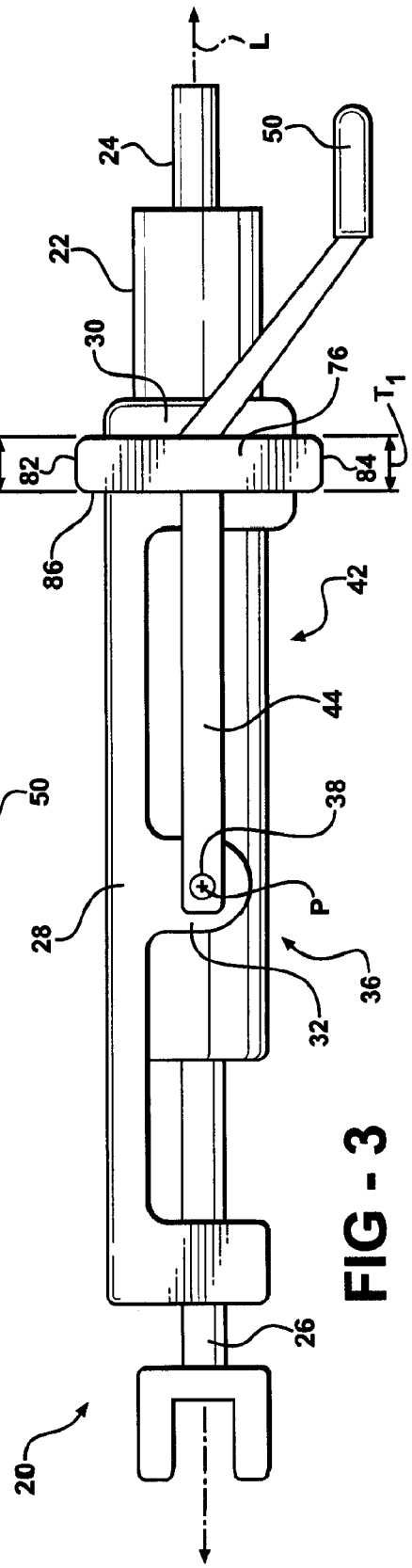

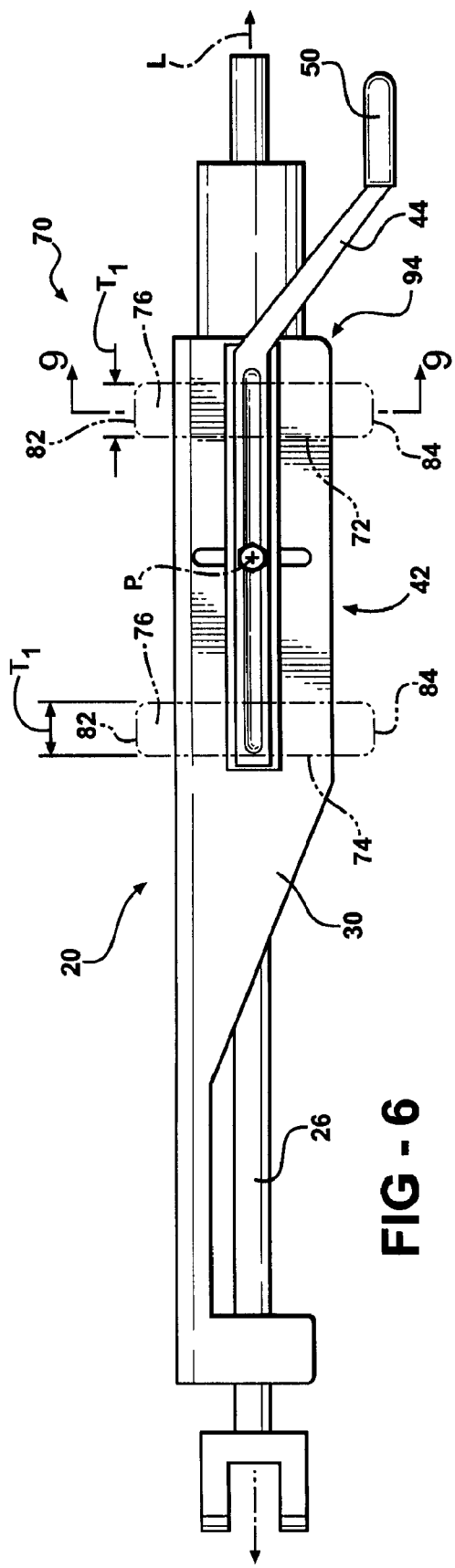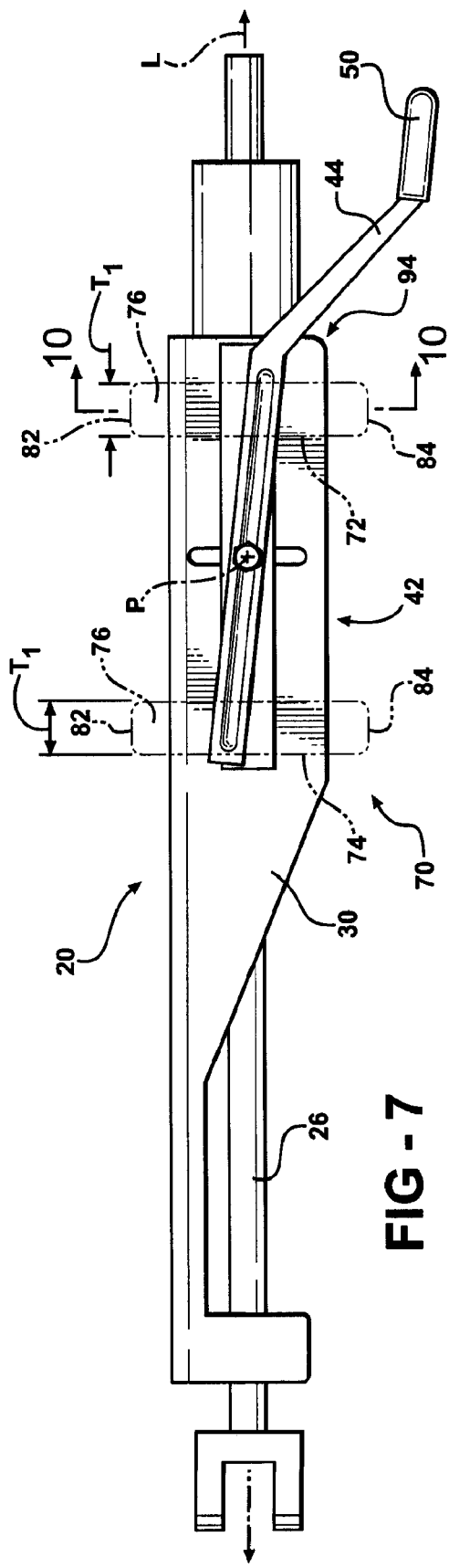

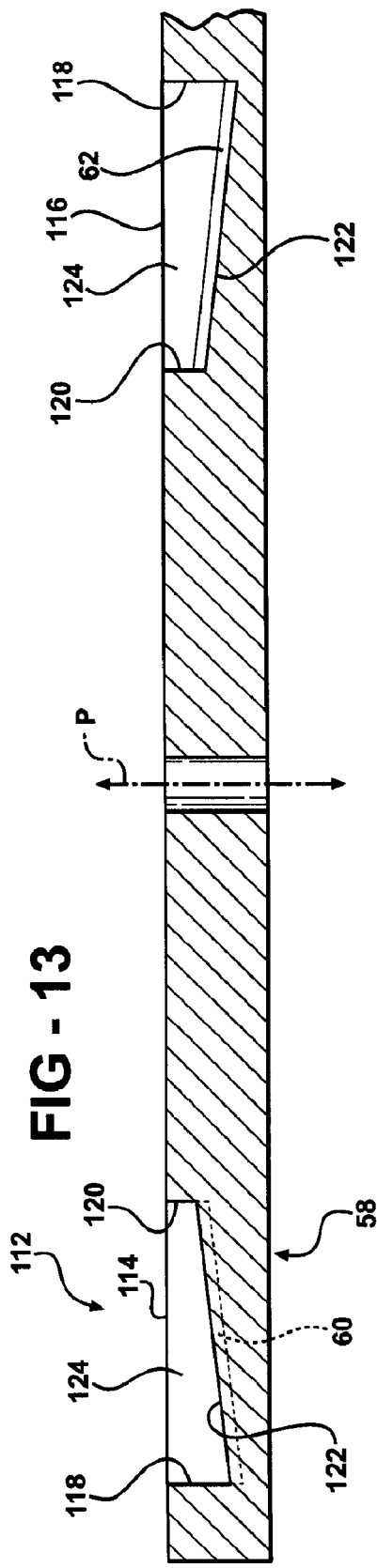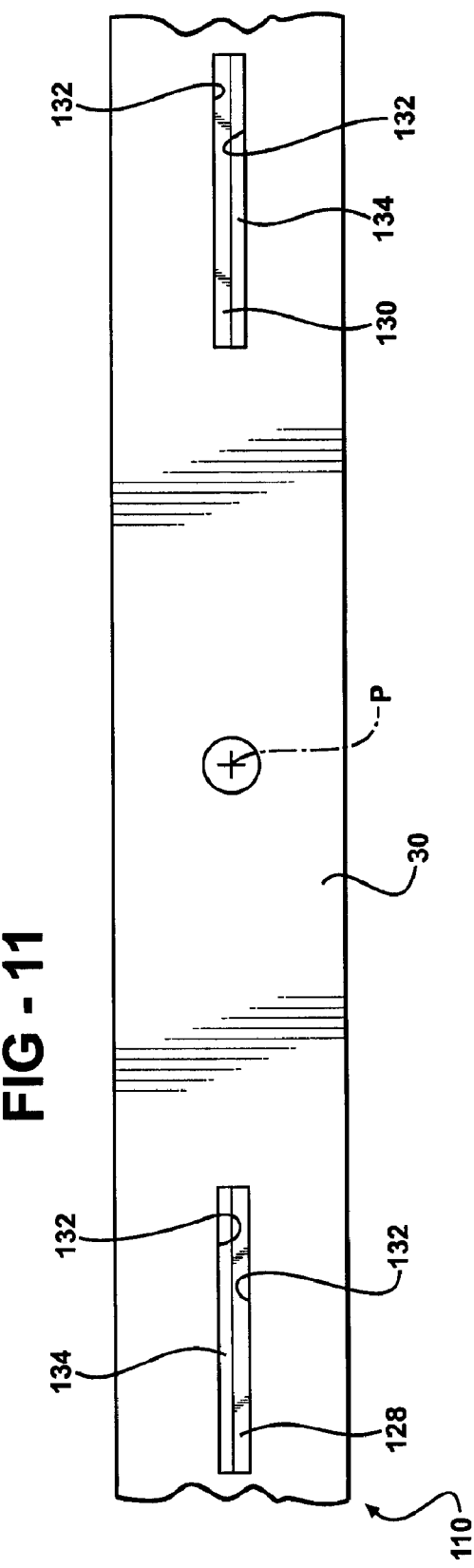

ADJUSTABLE STEERING COLUMN ASSEMBLY

BACKGROUND OF THE INVENTION

1. Field of the Invention

The present invention relates to an adjustable steering column assembly for a vehicle.

2. Description of the Prior Art

Vehicles may be equipped with an adjustable steering column assembly for adjusting a position of a steering wheel to enhance the comfort and safety for a user within a passenger compartment. For example, the assembly includes a column jacket moveable in a telescoping direction for moving the steering wheel closer to and away from the user. Also, the column jacket may move in a tilting direction for moving the steering wheel up and down relative to the user. These features cooperate to enable the user to adjust the steering wheel to a desired, convenient position for operating the vehicle and for moving the steering wheel out of the way to provide greater access to getting into and out of the driver's seat of the vehicle.

A lever is coupled to the column jacket and is moveable between a set position for preventing movement of the column jacket in at least one of the telescoping and tilting directions and an adjustable position for allowing movement of the column jacket in at least one of the telescoping and tilting directions. However, the lever rotation is large when moving between the set and adjustable positions and due to the limited space within the passenger compartment causes the lever to rotate to an inconvenient position for the user.

A locking device is coupled to the lever and moveable between a locked position and an unlocked position in response to rotation of the lever between the set and adjustable positions, respectively. The locking device includes a rake bolt coupled to the lever and extending above or below the column jacket. Having the rake bolt above or below the column jacket causes the assembly to be bulky and consume additional space within the passenger compartment.

The locking device further includes a first disk and a second disk coupled to the rake bolt and a plurality of pins disposed between the first and second disks and moveable between the locked and unlocked position. The pins include a first end defining a first contact point and a second end defining a second contact point. When the pins move to the locked position, the first and second contact points engage the first and second disks to create a point load force on the first and second ends. The first and second ends of the pins wear out as the pins move between the locked and unlocked positions in response to the user's changing preferences which decreases the point load force and reduces the life of the locking device.

SUMMARY OF THE INVENTION AND ADVANTAGES

The present invention provides for an adjustable steering column assembly having a column jacket defining a longitudinal axis and moveable in at least one of a telescoping direction and a tilting direction. A bracket is coupled to the column jacket with at least one pivot shaft defining a pivot axis extending transverse to the longitudinal axis and the pivot shaft coupled to the bracket along the pivot axis. A lever extends along the longitudinal axis and is mounted to the pivot shaft. The lever is rotatable about the pivot axis between a set position for preventing movement of the column jacket in at least one of the telescoping and tilting directions and an adjustable position for allowing movement of the column jacket in at least one of the telescoping and tilting directions. A locking device engaging the lever and is moveable between a locked position and an unlocked position in response to rotation of the lever between the set and adjustable positions, respectively. A restrictor encircles the bracket, the column jacket, the lever and the locking device for resisting against an outwardly radial force produced by the locking device when in the locked position to prevent movement of the column jacket in at least one of the telescoping and tilting directions.

The present invention also provides for an adjustable steering column assembly having a column jacket defining a longitudinal axis and moveable in at least one of a telescoping direction and a tilting direction. A bracket is coupled to the column jacket with at least one pivot shaft defining a pivot axis extending transverse to the longitudinal axis and the pivot shaft coupled to the bracket along the pivot axis. A lever extends along the longitudinal axis and is mounted to the pivot shaft. The lever is rotatable about the pivot axis between a set position for preventing movement of the column jacket in at least one of the telescoping and tilting directions and an adjustable position for allowing movement of the column jacket in at least one of the telescoping and tilting directions. A locking device engaging the lever and is moveable between a locked position and an unlocked position in response to rotation of the lever between the set and adjustable positions, respectively. The locking device includes at least one plate having a predetermined length extending along the longitudinal axis and transverse to the pivot axis. The plate includes a first edge and a second edge spaced from each other with the first edge engaging the lever along the predetermined length and the second edge engaging the bracket along the predetermined length such that the first and second edges rotate relative to the longitudinal axis between an upright position increasing a locking force between the lever and the bracket when in the locked position for preventing movement of the column jacket and an angled position decreasing the locking force between the lever and the bracket when in the unlocked position for allowing movement of the column jacket.

The present invention therefore provides for an adjustable steering column assembly having a restrictor encircling a bracket, a column jacket, a lever, and a locking device which reduces the complexity of the assembly by eliminating components, such as a rake bolt. In addition, the restrictor allows for a more compact assembly which creates more space within a passenger compartment. In other words, the compact assembly creates more space around the sensitive areas of a user, such as the knee area. Additionally, the restrictor may adjust for various tolerances of the bracket, the lever, the locking device, and the column jacket for reducing manufacturing and production costs. Further, a plate having a predetermined length with a first edge of the plate engaging the lever along the predetermined length and a second edge of the plate engaging the bracket along the predetermined length creates a line load along the first and second edges which reducing wear on the first and second edges to maintain a locking force and extend the life of the locking device.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is a side view of the adjustable steering column assembly having the pivot shaft spaced from the second column end of the column jacket;

FIG. 4 is an end view of the adjustable steering column assembly having a lever in a set position and the locking device in a locked position with the rollers shown in phantom;

FIG. 6 is a side view of the adjustable steering column assembly having a locking device of a second embodiment in a locked position with the lever in the set position and a first restrictor and a second restrictor shown in phantom;

FIG. 7 is a side view of the adjustable steering column assembly of having the locking device of the second embodiment in an unlocked position with the lever in the adjustable position and the first restrictor and the second restrictor shown in phantom;

FIG. 9 is an enlarged cross-sectional view of the lever in the set position with the first plate in an upright position taken along section line 9-9 in FIG. 6;

FIG. 10 is a enlarged cross-sectional view of the lever in the adjustable position with the first plate in an angled position taken along section line 10-10 in FIG. 7;

FIG. 11 is a side broken view of a bracket having a first slot and a second slot spaced from each other;

FIG. 12 is a side broken view of the lever having a first recess and a second recess spaced from each other; and FIG. 13 is a cross-sectional broken view of the lever taken along section line 13-13 of FIG. 12.

DETAILED DESCRIPTION OF THE INVENTION

Referring to the Figures, wherein like numerals indicate like or corresponding parts throughout the several views, an adjustable steering column assembly 20 for a vehicle (not shown) is generally shown in FIGS. 1-7.

Figure 1:
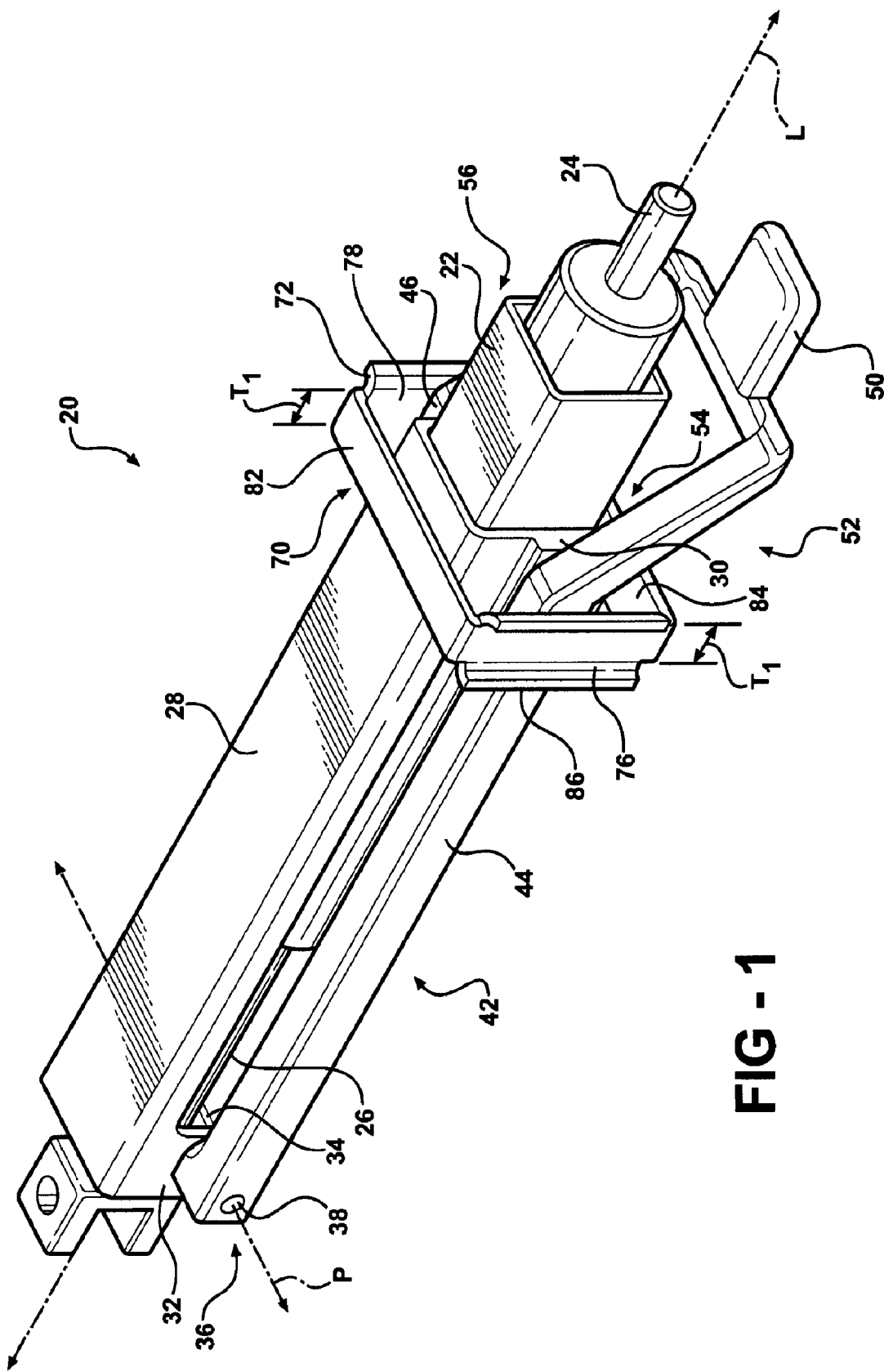
FIG. 1 is a perspective view of an adjustable steering column assembly including a column jacket having a first column end and a second column end with a pivot shaft coupled to the second column end.
Figure 2:
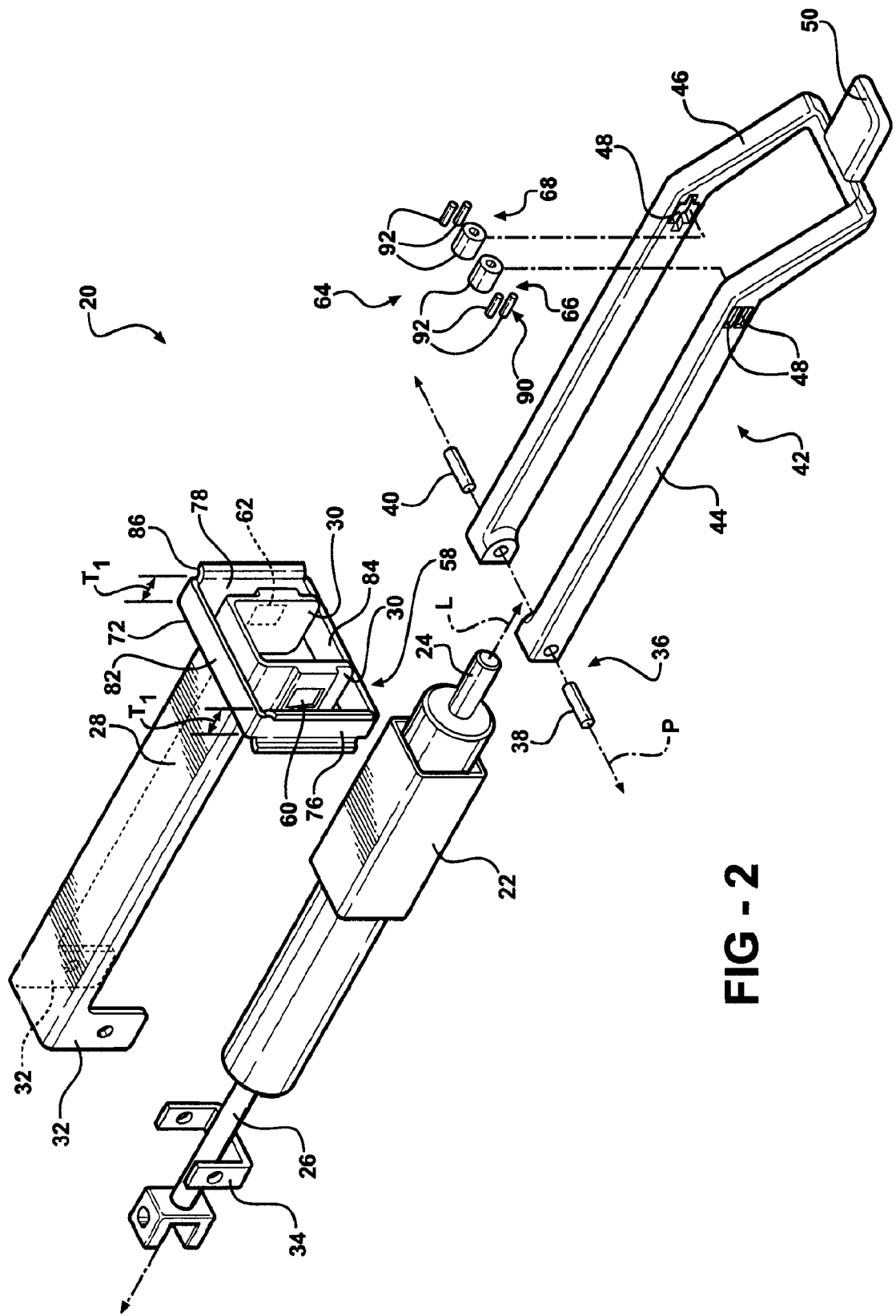
FIG. 2 is an exploded view of the adjustable steering column assembly including a locking device having a plurality of rollers.

Referring to FIGS. 1 and 2, the adjustable steering column assembly 20 includes a column jacket 22 defining a longitudinal axis L and moveable in at least one of a telescoping direction and a tilting direction. The column jacket 22 includes a first column end 24 and a second column end 26 spaced from each other along the longitudinal axis L. A steering wheel (not shown) is coupled to first column end 24 of the column jacket 22 for allowing a user to adjust the column jacket 22 in the telescoping and tilting directions. The column jacket 22 moves substantially parallel to the longitudinal axis L for the telescoping direction and substantially transverse to the longitudinal axis L for the tilting direction. In other words, the steering wheel moves closer to and away from the user when adjusting the telescoping direction and the steering wheel moves up and down relative to the user when adjusting the tilting direction. Preferably, the column jacket 22 moves in both the telescoping and tilting directions. However, it is to be appreciated that the column jacket 22 may move only in the telescoping direction or only in the tilting direction.

A bracket 28 is coupled to the column jacket 22 and the vehicle for supporting the column jacket 22. The bracket 28 includes a pair of first flanges 30 and a pair of second flanges 32 spaced from each other along the longitudinal axis L. The first and second flanges 30, 32 extend transverse to the longitudinal axis L and flank the column jacket 22. The bracket 28 may be formed of a steel material or any other suitable material for supporting the column jacket 22.

A brace 34 is coupled to the bracket 28 and the second column end 26 of the column jacket 22 for supporting the second column end 26 of the column jacket 22. Preferably, the brace 34 is coupled to the second flanges 32 of the bracket 28 and moveable relative to the bracket 28 for supporting the second column end 26 as the column jacket 22 moves in the tilting direction. It is to be appreciated that the brace 34 may be coupled anywhere along the bracket 28, such as spaced from the first flanges 30 and/or spaced from the second flanges 32.

The assembly 20 further includes at least one pivot shaft, generally shown at 36, defining a pivot axis P extending transverse to the longitudinal axis L. The pivot shaft 36 is coupled to the bracket 28 along the pivot axis P. More specifically, the pivot shaft 36 is mounted to one of the first and second flanges 30, 32 of the bracket 28. It is to be appreciated that the pivot shaft 36 may be disposed through one of the first flanges 30, both of the first flanges 30, one of the second flanges 32 or both of the first flanges 30 along the pivot axis P. Preferably, the pivot shaft 36 is mounted to both the second flanges 32.

The column jacket 22 may be coupled to the pivot shaft 36 and rotatable about the pivot axis P for allowing movement of the column jacket 22 in the tilting direction. However it is to be appreciated that the column jacket 22 may rotate in the tilting direction spaced from the pivot axis P (as shown in FIG. 3). In other words, the column jacket 22 may be rotatable in the tilting direction about the brace 34 supporting the second column end 26 with the brace 34 spaced from the pivot axis P. It is to be further appreciated that the column jacket 22 may be rotatable about the bracket 28 anywhere and coupled anywhere along the bracket 28, such as spaced from the first flanges 30, spaced from the second flanges 32, and/or spaced from the pivot axis P.

The at least one pivot shaft 36 is further defined as a first pivot shaft 38 and a second pivot shaft 40 extending along the pivot axis P. Preferably, the first pivot shaft 38 is coupled to one of the second flanges 32 and the second pivot shaft 40 is coupled to an other one of the second flanges 32. However it is to be appreciated that the first pivot shaft 38 may be coupled to one of the first flanges 30 and the second pivot shaft 40 may be coupled to an other one of the first flanges 30.

A lever, generally shown at 42, extends along the longitudinal axis L and is mounted to the pivot shaft 36. The lever 42 is rotatable about the pivot axis P between a set position for preventing movement of the column jacket 22 in at least one of the telescoping and tilting directions and an adjustable position for allowing movement of the column jacket 22 in at least one of the telescoping and tilting directions. The lever 42 is accessible by the user for allowing the user to rotate the lever 42 between the set and adjustable positions. The lever 42 is shown in the set position in FIGS. 1, 3, and 4 and the lever 42 is shown in the adjustable position in FIG. 5.

The lever 42 is further defined as a first lever 44 and further includes a second lever 46 extending along the longitudinal axis L and coupled to the pivot shaft 36. More specifically, the first lever 44 is coupled to the first pivot shaft 38 and the second lever 46 is coupled to the second pivot shaft 40. It is to be appreciated that the first and second levers 44, 46 are configured the same. Each of the first and second levers 44, 46 define an aperture 48 extending at least partially through the respective first and second levers 44, 46 transverse to the longitudinal axis L and spaced from the pivot axis P. It is to be appreciated that the aperture 48 is optional and will be discussed further below. A handle 50 is coupled to the first and second levers 44, 46 for allowing the user to rotate the first and second levers 44, 46 simultaneously.

A locking device, generally shown at 52, engages the lever 42 and is moveable between a locked position and an unlocked position in response to rotation of the lever 42 between the set and adjustable positions. The locking device 52 is spaced a predetermined distance from the pivot axis P for reducing rotation of the lever 42 between the set and adjustable positions. The locking device 52 is shown in the locked position in FIGS. 1, 3, and 4 and the locking device 52 is shown in the unlocked position in FIG. 5. Having the locking device 52 spaced from the pivot axis P causes the column jacket 22 to be more stable which improves the performance of the assembly 20 when in a vehicle collision. In other words, the column jacket 22 resists the urge to rotate during the vehicle collision.

The locking device 52 is further defined as a first locking device 54 engaging the first lever 44 and further including a second locking device 56 engaging the second lever 46. The first and second locking devices 54, 56 are spaced from each other and spaced from the pivot axis P. Preferably, the first and second locking devices 54, 56 are configured the same. However it is to be appreciated that the first and second locking devices 54, 56 may be configured differently.

The locking device 52 includes at least one cam surface, generally shown at 58, spaced from the pivot axis P and disposed on one of the lever 42 and the bracket 28. More specifically, the cam surface 58 is disposed on one of the first and second levers 44, 46, the first flanges 30 and the second flanges 32. Preferably, the cam surface 58 is disposed on at least one of the first flanges 30 of the bracket 28. The cam surface 58 is further defined as a first cam surface 60 and further includes a second cam surface 62 spaced from the pivot axis P with the first cam surface 60 disposed on one of the first flanges 30 and the second cam surface 62 disposed on an other one of the first flanges 30. It is to be appreciated that the first and second cam surfaces 60, 62 may be disposed on only one of the first flanges 30, both of the second flanges 32 or only one of the second flanges 32.

The locking device 52 further includes at least one locking segment, generally shown at 64, disposed on an other one of the lever 42 and the bracket 28 for engaging the cam surface 58. More specifically, the locking segment 64 is disposed on an other one of the lever 42, the first flanges 30 and the second flanges 32. Preferably, the locking segment 64 is disposed on the lever 42 and spaced from the pivot axis P. The at least one locking segment 64 is further defined as a first locking segment 66 and a second locking segment 68 spaced from the pivot axis P. The first locking segment 66 is coupled to the first lever 44 and the second locking segment 68 is coupled to the second locking segment 68. The first and second locking segments 66, 68 may be configured the same or configured differently. The first and second locking segments 66, 68 will be discussed further below.

Figure 5:
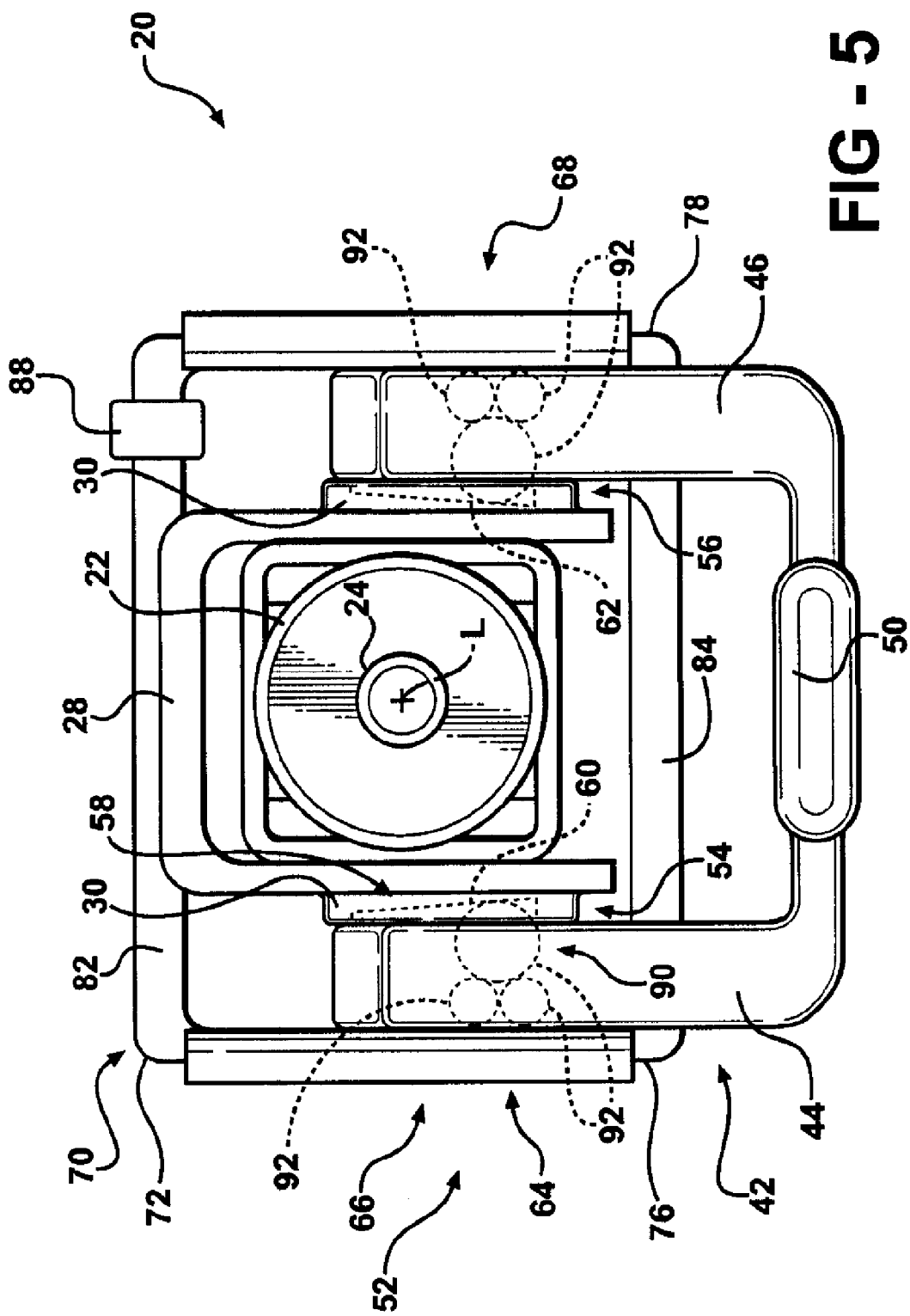
FIG. 5 is an end view of the adjustable steering column assembly having the lever in an adjustable position and the locking device in an unlocked position with the rollers shown in phantom.

As best shown in FIGS. 1, 4 and 5, the assembly 20 further includes a restrictor, generally shown at 70, encircling the bracket 28, the column jacket 22, the lever 42 and the locking device 52 for resisting against an outwardly radial force produced by the locking device 52 when in the locked position to prevent movement of the column jacket 22 in at least one of the telescoping and tilting directions. It is to be appreciated that more than one restrictor 70 may be utilized for resisting against the outwardly radial force. The restrictor 70 allows the locking device 52 to be coupled to the assembly 20 substantially parallel to the longitudinal axis L. In other words, the locking device 52 may be coupled on the column jacket 22 centerline. However it is to be appreciated that the locking device may be coupled above or below the longitudinal axis L. Further, the restrictor 70 allows for a more compact assembly 20 which creates more space around the sensitive areas of the user, such as the knee area. In the embodiment shown in FIGS. 6 and 7, the restrictor 70 may be further defined as a first restrictor 72 and further including a second restrictor 74 encircling the bracket 28, the column jacket 22, the lever 42, and the locking device 52, which is shown in phantom and will be discussed further below.

Referring back to FIGS. 1, 4 and 5, the restrictor 70 includes a first side section 76 and a second side section 78 spaced from each other and extending transverse to the longitudinal axis L with at least one of the first and second side sections 76, 78 spaced from the bracket 28 and having the lever 42 disposed therebetween. Preferably, both of the first and second side sections 76, 78 are spaced from the bracket 28 such that the first lever 44 is disposed between the bracket 28 and the first side section 76 and the second lever 46 is disposed between the bracket 28 and the second side section 78 with the first and second side sections 76, 78 resisting against the outwardly radial forces produced by the first and second locking devices 54, 56, respectively when in the locked position. More preferably, both of the first and second side sections 76, 78 are spaced from the first flanges 30 of the bracket 28 transverse to the longitudinal axis L. However it is to be appreciated that the first and second side sections 76, 78 may be spaced from the second flanges 32 or anywhere along the bracket 28.

The first and second side sections 76, 78 each define a predetermined width $T_1$ substantially aligning with the locking device 52 along the longitudinal axis L for resisting against the outwardly radial forces produced by the locking device 52 when in the locked position. The first and second side sections 76, 78 may define the predetermined width $T_1$ greater than, less than or equal to the locking device 52 along the longitudinal axis L. Preferably, the predetermined width $T_1$ of the first side section 76 substantially aligns with the first locking segment 66 and the predetermined width $T_1$ of the second side section 78 substantially aligning with the second locking segment 68. Thus the first side section 76 resists against the outwardly radial force produced by the first locking segment 66 and the second side section 78 resists against an outwardly radial force produced by the second locking segment 68 when in the locked position.

As best shown in FIG. 4, when the locking device 52 is in the locked position, the first and second side sections 76, 78 resist against the outwardly radial force produced by the first and second locking segments 66, 68 such that the first flanges 30 compress against the column jacket 22 for preventing movement of the column jacket 22 in at least one of the telescoping and tilting directions. The restrictor defines a gap 80 between the first and second levers 44, 46 and at least one of the first flanges 30 and the first and second side sections 76, 78. It is to be appreciated that the gap 80 may be disposed between both of the first flanges 30 and the first and second side sections 76, 78. The gap 80 between the first lever 44 and the first side section 76 increases when the first locking device 54 is in the locked position and the gap 80 between the second lever 46 and the second side section 78 increases when the second locking device 56 is in the locked position. As best shown in FIG. 5, the gap 80 between the first lever 44 and the first side section 76 decreases or is eliminated when the first locking device 54 is in the unlocked position and the gap 80 between the second lever 46 and the second side section 78 decreases or is eliminated when the second locking device 56 is in the locked position such that the first flanges 30 relieve pressure on the column jacket 22 for allowing movement of the column jacket 22 in at least one of the telescoping and tilting directions.

The restrictor 70 further includes a top side section 82 and a bottom side section 84 spaced from each other and extending transverse to the longitudinal axis L and adjacent to the first and second side sections 76, 78 with at least one of the top and bottom side sections 82, 84 coupled to the bracket 28. Preferably, the top side section 82 is mounted to the bracket 28 for maintaining the position of the restrictor 70 relative to the locking device 52. However it is to be appreciated that the bottom side section 84 may be mounted to the bracket 28. The locking device 52 rotates between the set and adjustable positions without interference from the top and bottom side sections 82, 84. In other words, having the locking device 52 spaced the predetermined distance from the pivot axis P reduces rotation of the lever 42 such that the top and bottom side sections 82, 84 may be disposed closer to the column jacket 22 which allows the restrictor 70 to be more compact.

The first and second side sections 76, 78 and the top and bottom side sections 82, 84 may be configured to form a rectangular configuration. However it is to be appreciated that the restrictor 70 may be in any configuration, such as circular, square, oval, triangular, etc. The restrictor 70 and the bracket 28 may be integrally formed to each other or mounted to each other by welding, fasteners or any other acceptable method known to those of ordinary skill in the art. The restrictor 70 may be formed of a steel material, a thermoplastic material having rigid properties or any other suitable material for resisting against the outwardly radial forces produced by the locking device 52 when in the locked position.

As shown in FIG. 1-4, the restrictor 70 may be further defined as a band 86 continuously encircling the bracket 28, the column jacket 22, the lever 42, and the locking device 52 for resisting against the outwardly radial force produced by the locking device 52 when in the locked position. As shown in FIG. 5, the restrictor 70 may include an adjustment mechanism 88 for compensating for various tolerances of the bracket 28, the lever 42, the locking device 52 and the column jacket 22. The adjustment mechanism 88 may be any mechanism known to those of ordinary skill in the art for compensating for tolerances, such as a nut and bolt mechanism, a ratchet mechanism, etc.

The locking segment 64 may be defined as at least one roller, generally shown at 90, coupled to the lever 42 and moveable along the cam surface 58 between the locked and unlocked positions. The roller 90 is disposed in the aperture 48 of the lever 42 with the roller 90 moveable along the cam surface 58. The at least one roller 90 is further defined as a plurality of rollers 92 with the rollers 92 disposed in the aperture 48 of the first and second levers 44, 46. The rollers 92 are moveable along the first and second cam surfaces 60, 62 and the restrictor 70. More specifically, the rollers 92 are moveable along the first and second cam surfaces 60, 62 and at least one of the first and second side sections 76, 78 of the restrictor 70. It is to be appreciated that the first and second locking segments 66, 68 may further be defined as a frictional surface (not shown) with the frictional surface of the first lever 44 movable along the first cam surface 60 and the frictional surface of the second lever 46 moveable along the second cam surface 62 between the locked and unlocked positions. The frictional surface may be formed of magnesium, aluminum, steel, composite, glass, rubber brake pad material or any other suitable material. The frictional surface may be disposed on the first and second levers 44, 46 by impregnating, blasting, texturing, casting, stamping, geometry optimization or any other suitable method. It is to be further appreciated the first and second locking segments 66, 68 may be defined as at least one pin (not shown) moveable along the cam surface 58 between the locked and unlocked positions. It is to be further appreciated that the first and second locking segments 66, 68 may be any combination of the frictional surface, the pin, and the rollers 92.

Referring to FIGS. 6-10, a second embodiment of a locking device is generally shown at 94. Corresponding components discussed in the first embodiment have the same reference numerals in this embodiment and additional or different components of this embodiment have different reference numerals. The primary distinction between the locking device 52 of the first embodiment and the locking device 94 of this embodiment is the configuration of the locking segment 64. It is to be appreciated that more than one locking device 94 may be utilized in this embodiment.

Figure 8:
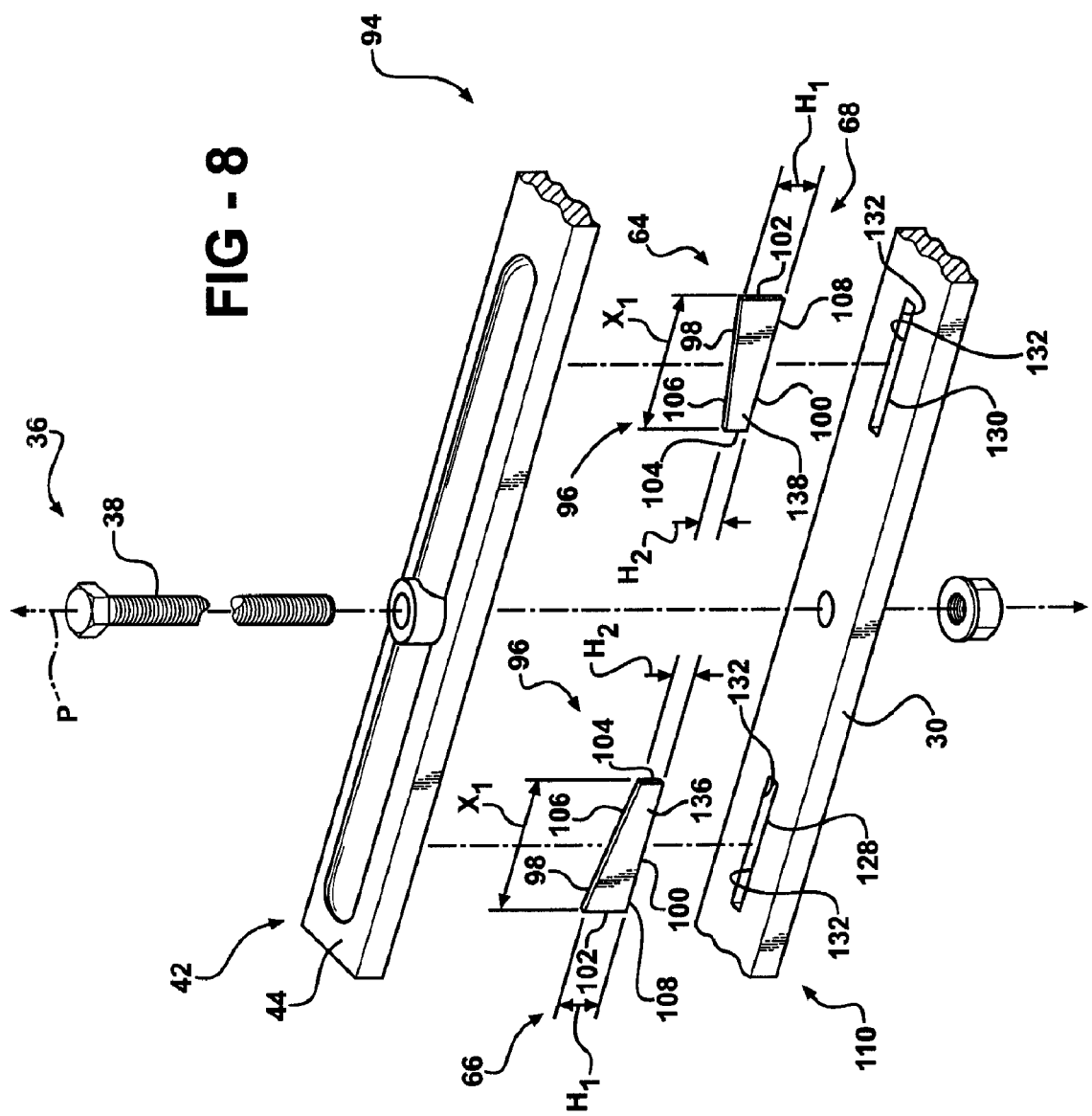
FIG. 8 is an exploded enlarged view of the locking device of the second embodiment having a first plate and a second plate taken from FIG. 6.

As best shown in FIG. 8, the locking device 94 includes at least one plate 96 having a predetermined length $X_1$ extending along the longitudinal axis L and transverse to the pivot axis P. More specifically, the locking segment 64 is further defined as the plate 96. It is to be appreciated that the plate 96 may be combined with the rollers 92, the pin, and the frictional surfaces. The plate 96 includes a first edge 98 and a second edge 100 spaced from each other with the first edge 98 engaging the lever 42 along the predetermined length $X_1$ and the second edge 100 engaging the bracket 28 along the predetermined length $X_1$.

Figures 9, 10, 12:
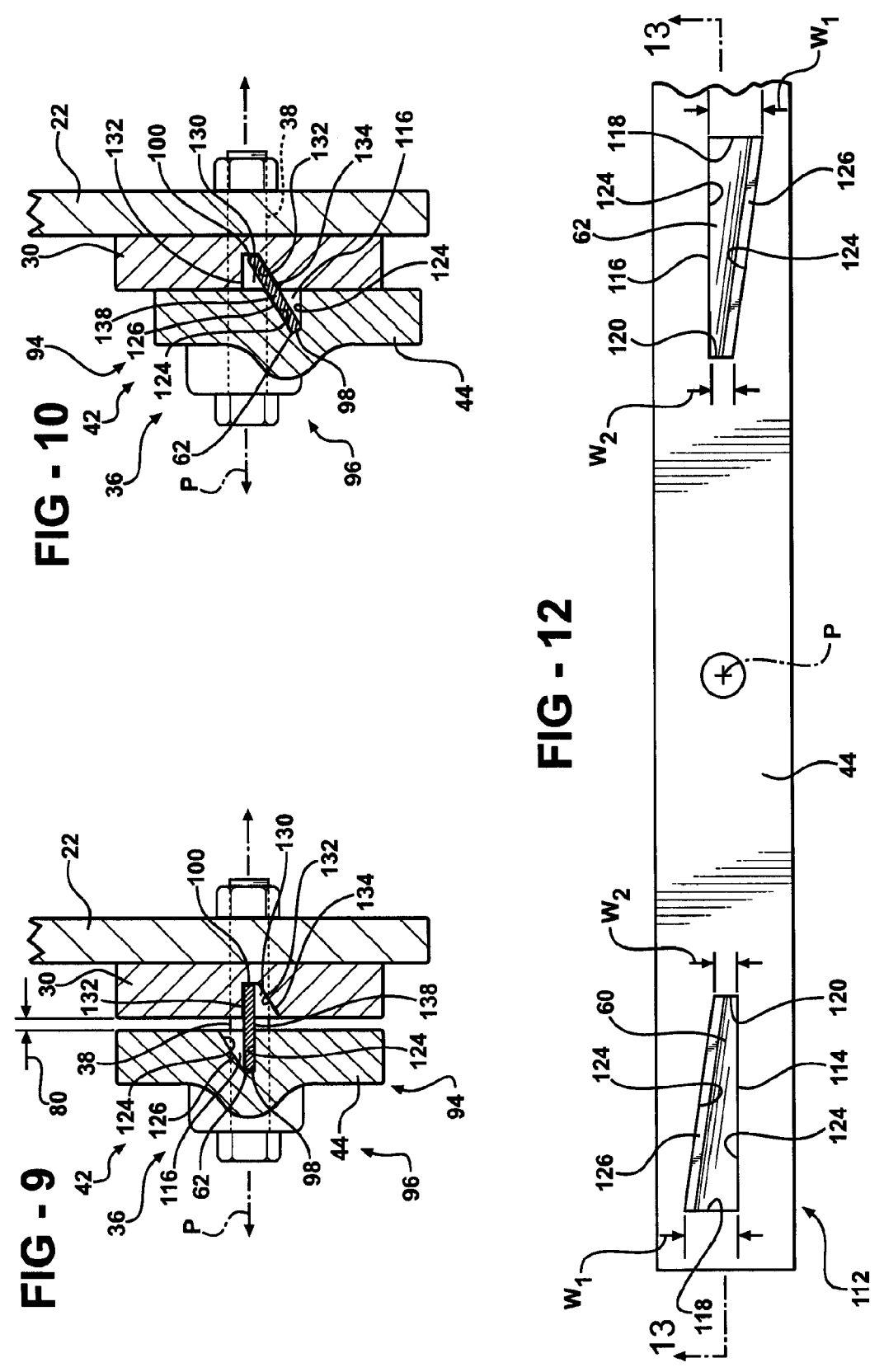

Referring to FIGS. 9 and 10, the first and second edges 98, 100 rotate relative to the longitudinal axis L between an upright position increasing a locking force between the lever 42 and the bracket 28 when in the locked position for preventing movement of the column jacket 22 and an angled position decreasing the locking force between the lever 42 and the bracket 28 when in the unlocked position for allowing movement of the column jacket 22. The plate 96 is shown in the upright position in FIG. 9 with the lever 42 in the locked position for preventing movement of the column jacket 22 in at least one of the tilting and telescoping directions. More specifically, the locking force increases when in the upright position such that the gap 80 between the plate 96 and the bracket 28 increases with the bracket 28 compressing against the column jacket 22 to prevent movement. The plate 96 is shown in the angled position in FIG. 10 with the lever 42 in the unlocked position for allowing movement of the column jacket 22 in at least one of the tilting and telescoping directions. More specifically, the locking force decreases when in the angled position such that the gap 80 between the plate 96 and the bracket 28 decreases or is eliminated with the bracket 28 relieving pressure on the column jacket 22 to allow movement. Having the first and second edges 98, 100 engaging the lever 42 and bracket 28 respectively creates a line load along the first and second edges 98, 100 which reduces wear on the first and second edges 98, 100 to maintain the locking force and extend the life of the locking device 94.

Referring back to FIG. 8, the plate 96 further includes a first end 102 and a second end 104 adjacent the first and second edges 98, 100. The first end 102 includes a first height $H_1$ and the second end 104 includes a second height $H_2$ with the first height $H_1$ greater than the second height $H_2$. The first and second heights $H_1$, $H_2$ are also less than the predetermined length $X_1$ of the plate 96. However, it is to be appreciated that the first height $H_1$ may be less than or equal to the second height $H_2$.

One of the first and second edges 98, 100 include an angled surface 106 extending from the first end 102 to the second end 104 along the predetermined length $X_1$ and an other one of the first and second edges 98, 100 include a flat surface 108 extending from the first end 102 to the second end 104 along the predetermined length $X_1$. Preferably, the first edge 98 defines the angled surface 106 and the second edge 100 defines the flat surface 108. However it is to be appreciated that the first edge 98 may define the flat surface 108 and the second edge 100 may define the angled surface 106.

As best shown in FIGS. 11 and 12, one of the lever 42 and the bracket 28 defines at least one slot, generally shown at 110, disposed along the longitudinal axis L for receiving one of the first and second edges 98, 100 and an other one of the lever 42 and the bracket 28 defines at least one recess, generally shown at 112, disposed along the longitudinal axis L for receiving an other one of the first and second edges 98, 100. Preferably, the slot 110 and the recess 112 face each other and the cam surface 58 is disposed in one of the slot 110 and the recess 112. More preferably, the cam surface 58 and the first edge 98 are disposed in the recess 112 on the lever 42 and the second edge 100 is disposed in the slot 110 on the bracket 28. However it is to be appreciated that the cam surface 58 and the first edge 98 may be disposed in the slot 110 on the lever 42 and the second edge 100 disposed in the recess 112 on the bracket 28. Preferably, the cam surface 58 extends transverse to the longitudinal axis L. It is further to be appreciated that the cam surface 58 may be eliminated.

The at least one recess 112 is further defined as a first recess 114 and a second recess 116 spaced from the first recess 114 along the longitudinal axis L. Preferably, the first and second recesses 114, 116 are offset from each other along the longitudinal axis L. However it is to be appreciated that the first and second recesses 114, 116 may be parallel to each other.

The recess 112 includes a first end surface 118 having a first width $W_1$ and a second end surface 120 having a second width $W_2$ with the first width $W_1$ greater than the second width $W_2$. However it is to be appreciated that the first width $W_1$ may be less than or equal to the second width $W_2$. More specifically, the first and second recesses 114, 116 include the first and second end surfaces 118, 120. Referring to FIG. 13, the recess 112 further includes a sloped surface 122 extending from the first end surface 118 to the second end surface 120 along the longitudinal axis L with the first end 102 of the plate 96 abutting the first end surface 118 and the second end 104 of the plate 96 abutting the second end surface 120. More specifically, the first and second recesses 114, 116 include the sloped surface 122.

Referring back to FIG. 12, the recess 112 also includes a plurality of first side walls 124 spaced from each other with one of the first side walls 124 having a first inclined surface 126 extending angularly away from an other one of first side walls 124 for allowing the plate 96 to move between the angled position and the upright position. As shown in FIG. 10, the plate 96 abuts the first inclined surface 126 when in the angled position and as shown in FIG. 9, the plate 96 abuts one of the first side walls 124 spaced from the first inclined surface 126 when in the upright position. More specifically, the first and second recesses 114, 116 include the first side walls 124 and the first inclined surface 126 with the first inclined surface 126 of each of the first and second recesses 114, 116 extending angularly away from each other.

Referring back to FIG. 11, the at least one slot 110 is further defined as a first slot 128 and a second slot 130 spaced from the first slot 128 along the longitudinal axis L. The first and second slots 128, 130 may be parallel to each other or offset from each other. The slot 110 includes a plurality of second side walls 132 spaced from each other with one of the second side walls 132 having a second inclined surface 134 extending angularly away from an other one of the second side walls 132 for allowing the plate 96 to move between the angled position and the upright position. More specifically, the first and second slots 128, 130 include the second side walls 132 and the second inclined surface 134 with the second inclined surface 134 of each of the first and second slots 128, 130 extending angularly away from each other. Referring to FIG. 10, the plate 96 abuts the second inclined surface 134 when in the angled position and referring to FIG. 9, the plate 96 abuts one of the second side walls 132 spaced from the second inclined surface 134 when in the upright position. In other words, when the plate 96 is in the angled position, the plate 96 abuts both the first and second inclined surfaces 126, 134 and when the plate 96 is in the upright position, the plate 96 abuts both of the first and second side walls 124, 132 spaced from the first and second inclined surfaces 126, 134, respectively. The plate 96 abuts both of the first and second side walls 124, 132 when in the upright position for stabilizing the plate 96, i.e. for preventing the plate 96 from falling over while the user adjusts the position of the steering wheel.

Referring to FIG. 8, the at least one plate 96 is further defined as a first plate 136 and a second plate 138 with the first edge 98 of each of the first and second plates 136, 138 facing away from each other when in the angled position such that the first plate 136 rotates in a first direction and the second plate 138 rotates in a second direction opposite the first direction relative to the longitudinal axis L. When the first plate 136 is in the angled position, the first plate 136 abuts both the first inclined surface 126 of the first recess 114 and the second inclined surface 134 of the first slot 128. In addition, when the second plate 138 is in the angled position, the second plate 138 abuts both the first inclined surface 126 of the second recess 116 and the second inclined surface 134 of the second slot 130. When the first plate 136 is in the upright position, the first plate 136 abuts both the first side wall 124 of the first recess 114 spaced from the first inclined surface 126 of the first recess 114 and the second side wall 132 of the first slot 128 spaced from the second inclined surface 134 of the first slot 128. In addition, when the second plate 138 is in the upright position, the second plate 138 abuts both the first side wall 124 of the second recess 116 spaced from the first inclined surface 126 of the second recess 116 and the second side wall 132 of the second slot 130 spaced from the second inclined surface 134 of the second slot 130.

It is to be appreciated that the first and second plates 136, 138 may rotate in the same direction, which will depend on the orientation of the first and second plates 136, 138 relative to each other or will depend on the direction the first and second levers 44, 46 rotate relative to each other. For example, when the first plate 136 is disposed on the first lever 44 and the second plate 138 is disposed on the second lever 46, the first and second plates 136 rotate in opposite directions relative to the longitudinal axis L when the first and second lever 44, 46 rotate in the same direction. As another example, when the first and second plates 136, 138 are spaced from each other along the longitudinal axis L and disposed only on the first lever 44, the first and second plates 136, 138 rotate in opposite directions. As an additional example, when the first and second plates 136, 138 are spaced from each other transverse to the longitudinal axis L and disposed only on the first lever 44, the first and second plates 136, 138 rotate in the same direction. It is to be appreciated that other combinations of the orientations of the first and second plates 136, 138 relative to each other are contemplated without deviating from the present invention. It is to be further appreciated that other combinations that the first and second levers 44, 46 rotate relative to each other are contemplated without deviated from the present invention.

The restrictor 70 may encircle the bracket 28, the column jacket 22, the lever 42 and the locking device 94 for resisting against the outwardly radial force produced by the locking device 94 when in the locked position to prevent movement of the column jacket 22 in at least one of said telescoping and tilting directions. More specifically, referring to FIGS. 6 and 7, the first and second restrictors 72, 74 are shown in phantom, with the first restrictor 72 resists against the outwardly radial force produced by the first plate 136 and the second restrictor 74 resists against the outwardly radial force produced by the second plate 138 when in the locked position. The first restrictor 72 substantially aligns with the first plate 136 along the longitudinal axis L and the second restrictor 74 substantially aligns with the second plate 138 along the longitudinal axis L. In other words, the predetermined width $T_1$ of the first side section 76 substantially aligns with the predetermined length $X_1$ of the first plate 136 and the predetermined width $T_1$ of the second side section 78 substantially aligns with the predetermined length $X_1$ of the second plate 138. However it is to be appreciated that only one of the first and second restrictors 72, 74 may be utilized or both of the first and second restrictors 72, 74 may be eliminated for the locking device 94 of the second embodiment.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. An adjustable steering column assembly for a vehicle, said assembly comprising:
    a column jacket defining a longitudinal axis and moveable in at least one of a telescoping direction and a tilting direction;
    a bracket coupled to said column jacket;
    at least one pivot shaft defining a pivot axis extending transverse to said longitudinal axis with said pivot shaft coupled to said bracket along said pivot axis;
    a lever extending along said longitudinal axis and mounted to said pivot shaft with said lever rotatable about said pivot axis between a set position for preventing movement of said column jacket in at least one of said telescoping and tilting directions and an adjustable position for allowing movement of said column jacket in at least one of said telescoping and tilting directions;
    a locking device engaging said lever and moveable between a locked position and an unlocked position in response to rotation of said lever between said set and adjustable positions, respectively; and
    a restrictor encircling said bracket, said column jacket, said lever and said locking device, said restrictor having a first side section and a second side section spaced from each other, said first and second side sections contacting said locking device for resisting against an outwardly radial force produced by said locking device when in said locked position to prevent movement of said column jacket in at least one of said telescoping and tilting directions.

2. An assembly as set forth in claim 1, wherein said first side section and said second side section extend transverse to said longitudinal axis with at least one of said first and second side sections spaced from said bracket and having said lever disposed therebetween.

3. An assembly as set forth in claim 2 wherein said restrictor includes a top side section and a bottom side section spaced from each other and extending transverse to said longitudinal axis and adjacent to said first and second side sections with at least one of said top and bottom side sections coupled to said bracket.

4. An assembly as set forth in claim 3 wherein said locking device is spaced a predetermined distance from said pivot axis for reducing rotation of said lever between said set and adjustable positions such that said lever rotates between said set and adjustable positions without interference from said top and bottom side sections.

5. An assembly as set forth in claim 2 wherein said first and second side sections each define a predetermined width substantially aligning with said locking device along said longitudinal axis for resisting against said outwardly radial forces produced by said locking device when in said locked position.

6. An assembly as set forth in claim 2 wherein said first and second side sections are spaced from said bracket and said lever is further defined as a first lever and further includes a second lever extending along said longitudinal axis and coupled to said pivot shaft with said first lever disposed between said bracket and said first side section and said second lever disposed between said bracket and said second side section.

7. An assembly as set forth in claim 6 wherein said locking device further defined as a first locking device engaging first lever and further including a second locking device engaging said second lever with said first and second side sections resisting against said outwardly radial forces produced by said first and second locking devices, respectively when in said locked position.

8. An assembly as set forth in claim 1 wherein said restrictor includes an adjustment mechanism for compensating for various tolerances of said bracket, said lever, said locking device and said column jacket.

9. An assembly as set forth in claim 1 wherein said restrictor is further defined as a band continuously encircling said bracket, said column jacket, said lever, and said locking device for resisting against said outwardly radial force produced by said locking device when in said locked position.

10. An assembly as set forth in claim 1, wherein said first side section contacts a first roller, and said second side section contacts a second roller for resisting against the outwardly radial force produced by said locking device when in said locked position.

11. An adjustable steering column assembly for a vehicle, said assembly comprising:
    a column jacket defining a longitudinal axis and moveable in at least one of a telescoping direction and a tilting direction;
    a bracket coupled to said column jacket;
    at least one pivot shaft defining a pivot axis extending transverse to said longitudinal axis with said pivot shaft coupled to said bracket along said pivot axis;
    a lever having first and second levers extending along said longitudinal axis and mounted to said pivot shaft with said first and second levers rotatable about said pivot axis between a set position for preventing movement of said column jacket in at least one of said telescoping and tilting directions and an adjustable position for allowing movement of said column jacket in at least one of said telescoping and tilting directions; and a locking device having first and second rollers, said first roller engaging said first lever, and said second roller engaging said second lever, said locking device moveable between a locked position and an unlocked position in response to rotation of said first and second levers between said set and adjustable positions, respectively, and wherein the assembly further comprises a restrictor encircling said bracket, said column jacket, said lever and said locking device, said restrictor having a first side section and a second side section spaced from each other, said first and second side sections contacting said first and second rollers, respectively, for resisting against an outwardly radial force produced by said locking device when in said locked position to prevent movement of said column jacket in at least one of said telescoping and tilting directions.

* * * * *